United States Patent
Rajasimman et al.

(10) Patent No.: US 8,494,532 B2
(45) Date of Patent: Jul. 23, 2013

(54) METHOD TO FILTER UNAUTHORIZED MOBILE DEVICES IN CODE DIVISION MULTIPLE ACCESS NETWORKS

(75) Inventors: Vijayasimman Rajasimman, Richardson, TX (US); Nivedan Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1120 days.

(21) Appl. No.: 11/848,733

(22) Filed: Aug. 31, 2007

(65) Prior Publication Data

US 2009/0059870 A1  Mar. 5, 2009

(51) Int. Cl.
*H04W 36/00* (2009.01)
*H04W 4/00* (2009.01)

(52) U.S. Cl.
USPC ............ 455/444; 455/435.1; 455/435.2; 455/435.3; 455/436; 455/438; 370/331; 370/332

(58) Field of Classification Search
USPC .......... 455/435.1–435.3, 436–445, 524–525, 455/435.1–435.3; 370/331–332
See application file for complete search history.

(56) References Cited

U.S. PATENT DOCUMENTS

| | | | |
|---|---|---|---|
| 5,329,635 A * | 7/1994 | Wadin et al. | 455/438 |
| 5,577,168 A | 11/1996 | Haas et al. | |
| 5,754,945 A * | 5/1998 | Lin et al. | 455/436 |
| 5,794,156 A * | 8/1998 | Alanara | 455/517 |
| 6,091,955 A | 7/2000 | Aalto et al. | |
| 6,205,132 B1 | 3/2001 | Hong et al. | |
| 6,321,090 B1 | 11/2001 | Soliman | |
| 6,424,834 B1 | 7/2002 | Chang et al. | |
| 6,430,168 B1 | 8/2002 | Djurkovic et al. | |
| 6,505,050 B1 * | 1/2003 | Brudos et al. | 455/458 |
| 6,621,811 B1 | 9/2003 | Chang et al. | |
| 6,826,402 B1 | 11/2004 | Tran | |
| 6,928,283 B2 | 8/2005 | Rudolf | |
| 7,522,518 B1 * | 4/2009 | Satapathy | 370/229 |
| 2002/0085516 A1 * | 7/2002 | Bridgelall | 370/329 |
| 2002/0086675 A1 | 7/2002 | Mansour | |
| 2004/0062214 A1 * | 4/2004 | Schnack et al. | 370/315 |
| 2004/0176094 A1 * | 9/2004 | Kim et al. | 455/438 |
| 2005/0148368 A1 * | 7/2005 | Scheinert et al. | 455/561 |
| 2006/0088020 A1 * | 4/2006 | Gass | 370/338 |
| 2007/0054664 A1 * | 3/2007 | Kim | 455/432.1 |
| 2007/0213067 A1 * | 9/2007 | Li et al. | 455/444 |

OTHER PUBLICATIONS

Weal, Paul et al; "Optimisation of CDMA-Based Mobile Telephone Networks: Algorithmic Studies on Real-World Networks"; University of Exeter, UK; 2006, 10 pgs.

* cited by examiner

*Primary Examiner* — Jean Gelin
*Assistant Examiner* — Dung Hong

(57) ABSTRACT

A method for managing an attempted connection between a home base station (HBS) and a device not registered with the HBS is provided. The method includes transferring the connection when the attempted connection can be transferred to a traditional base station. When the attempted connection cannot be transferred to a traditional base station, it is determined whether a portion of the resources of the HBS can be used by the device not registered with the HBS. When a portion of the resources can be used, the portion is used. When a portion of the resources cannot be used, the attempted connection is not completed.

20 Claims, 8 Drawing Sheets

METHOD TO FILTER UNAUTHORIZED MOBILE DEVICES IN CODE DIVISION MULTIPLE ACCESS NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Natural and man-made obstacles can create areas of inadequate coverage in a wireless telecommunications network. For example, a user device may experience a dropped call or an inability to initiate a call when the user device is inside a building or is otherwise blocked from successfully sending or receiving radio frequency (RF) signals. As used herein, the term "user device" refers to devices that might be used by users in a telecommunications network. This typically includes mobile terminals such as mobile telephones, personal digital assistants, handheld computers, and similar devices, but can also include fixed terminals such as residential gateways.

SUMMARY

In one embodiment, a method for managing an attempted connection between a home base station (HBS) and a device not registered with the HBS is provided. The method includes transferring the connection when the attempted connection can be transferred to a traditional base station. When the attempted connection cannot be transferred to a traditional base station, it is determined whether a portion of the resources of the HBS can be used by the device not registered with the HBS. When a portion of the resources can be used, the portion is used. When a portion of the resources cannot be used, the attempted connection is not completed.

In another embodiment, a system for managing communications between an HBS and a device not registered with the HBS is provided. The system includes an HBS having a processor configured to execute a plurality of policies. The policies include an active service redirection policy, a low priority access policy, a restriction treatment policy, and an E911 access policy. In the active service redirection policy, the call is handed off to a traditional base station when the traditional base station has a sufficient signal strength to reliably communicate with the device not registered with the HBS. The low priority access policy is implemented when the active service reduction policy is inapplicable. In the low priority access policy, when a portion of resources of the HBS is available to the device not registered with the HBS without disruption of existing communications on the HBS, the HBS is used for the call. The restriction treatment policy is implemented when the active service reduction policy and the low priority access policy are inapplicable. In the restriction treatment policy, the call is not connected by the HBS. In the E911 access policy, when the call is a call to a public emergency response system, the call is connected to the public emergency response system.

In another embodiment, an HBS is provided. The HBS includes a component operable to filter a call to the HBS from a device not registered with the HBS by enforcing a plurality of policies. The policies specify that when a traditional base station has a sufficient signal strength to reliably communicate with the device not registered with the HBS, the call is handed off to the traditional base station. When the traditional base station does not have the sufficient signal strength to reliably communicate with the device not registered with the HBS, it is determined whether the call is a call to a public emergency response system. When the call is a call to the public emergency response system, the call is allowed to pass through the HBS. When the call is not a call to the public emergency response system, it is determined whether a portion of resources of the HBS is available to the device not registered with the HBS without disruption of existing communications on the HBS. When a portion of the resources of the HBS is available to the device not registered with the HBS without disruption of existing communications on the HBS, the HBS is used for the call. When a portion of the resources of the HBS is not available to the device not registered with the HBS without disruption of existing communications on the HBS, the call is not completed.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
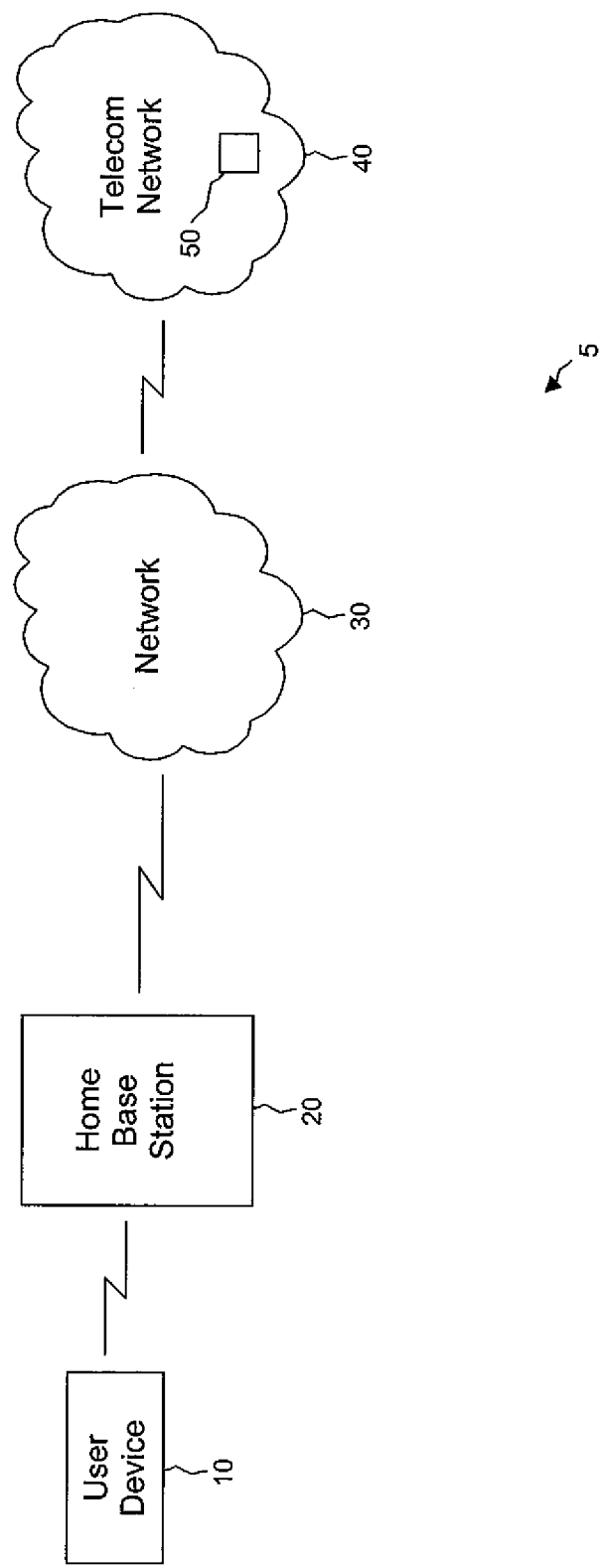
FIG. 1 is a diagram of a telecommunications system according to an embodiment of the disclosure.

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Various types of private base station have been proposed to deal with areas of inadequate coverage in a telecommunications network. These units can perform functions similar to those performed by a publicly accessible base station but at a reduced power. The term "home base station" (HBS) will be used herein to refer to such base stations, but it should be understood that the units could be used in business offices, government buildings, schools, and other locations besides homes.

While a traditional wireless telecommunications base station might provide coverage over a wide geographic region for a large number of users, an HBS might provide coverage only in an area the size of a typical home and for only a limited number of users. When an HBS is placed inside a home, for example, a user device in the home can send RF signals to and receive RF signals from the HBS rather than making potentially unsuccessful attempts at sending RF signals to and receiving RF signals from a traditional, publicly accessible base station. The HBS can then communicate with subsequent components in a telecommunications network. Connecting to the telecommunications network via the HBS can shrink or eliminate areas of inadequate coverage that might exist in the home when connections are attempted via a traditional base station.

An HBS is typically intended for use by only a small number of user devices. An identifier for each user device authorized to use a particular HBS might be associated with an identifier for that HBS. Only the user devices that have been registered with the HBS in this manner might be able to gain access to the HBS. For example, an HBS in a home might be configured to be used only by user devices belonging to family members who live in that home. A different user device that entered or came near the home might not be able to gain access to the HBS. Similarly, the family members from that home might not be able to use an HBS in a different home.

As is well known in the art, a code division multiple access (CDMA) base station might broadcast a beacon signal that provides information about the base station. User devices can use the beacon signal to determine which base station to connect to and to determine whether a call should be handed off from one base station to another. For a traditional, publicly accessible base station, the beacon signal typically operates at approximately the same power as the signal that carries the actual voice and data traffic. For an HBS, the beacon signal typically operates at a greatly reduced power so that the beacon signal can be detected only by user devices that are physically close to the HBS, such as user devices that are in the same home as the HBS.

A traditional, publicly accessible base station might transmit voice and data traffic to subsequent components in the telecommunications network via RF signals. For some HBSs, voice and data traffic might be transmitted to the subsequent components via the Internet. That is, an HBS might contain appropriate hardware and software that allows the HBS to connect to the Internet via standard wired or wireless connections. Data transmitted from a user device to the HBS via an RF signal might be transmitted from the HBS to the subsequent components in the telecommunications network via the Internet connection. In this way, an owner of an HBS might be able to conduct wireless communications in a location where a traditional base station is inaccessible or where access to a traditional base station is unreliable.

FIG. 1 illustrates an embodiment of a system 5 for communication via a home base station (HBS). A user device 10 can communicate wirelessly with an HBS 20 that is intended to be used only by that user device 10 or by a small set of user devices 10. The HBS 20 can connect to a network 30, such as the Internet, through a wired or wireless connection. Via the network 30, the HBS 20 can connect to a telecommunications network 40, which might be a code division multiple access (CDMA) network or some other well known type of telecommunications network. In this way, when the user device 10 is near the HBS 20, the user device 10 can engage in wireless telecommunications when there is no traditional base station nearby or when access to a traditional base station is unreliable.

The telecommunications network 40 might include a component 50 that can perform at least some of the functions related to communication with the HBS 20. Actions that are described herein as happening to the network 40 or as being taken by the network 40 should be understood as possibly happening to or being taken by one or more such components 50 within the network 40, such as servers or other computing devices. The components 50 may be operated, for example, by the telecommunications network provider or wireless network provider associated with the user device 10.

The HBS 20 might broadcast its beacon signal throughout a home and possibly in some areas just outside the home. A different user device that is not registered with the HBS 20 may be present in a neighboring home or may be passing by the home with the HBS 20. If such a device were within the region in which the HBS 20 broadcasts its beacon signal, the device might pick up the beacon signal from the HBS 20. An unregistered user device that picks up such a signal can be referred to as a foreign device, and a neighbor or passer-by using a foreign device can be referred to as a foreign user.

Figure 2:
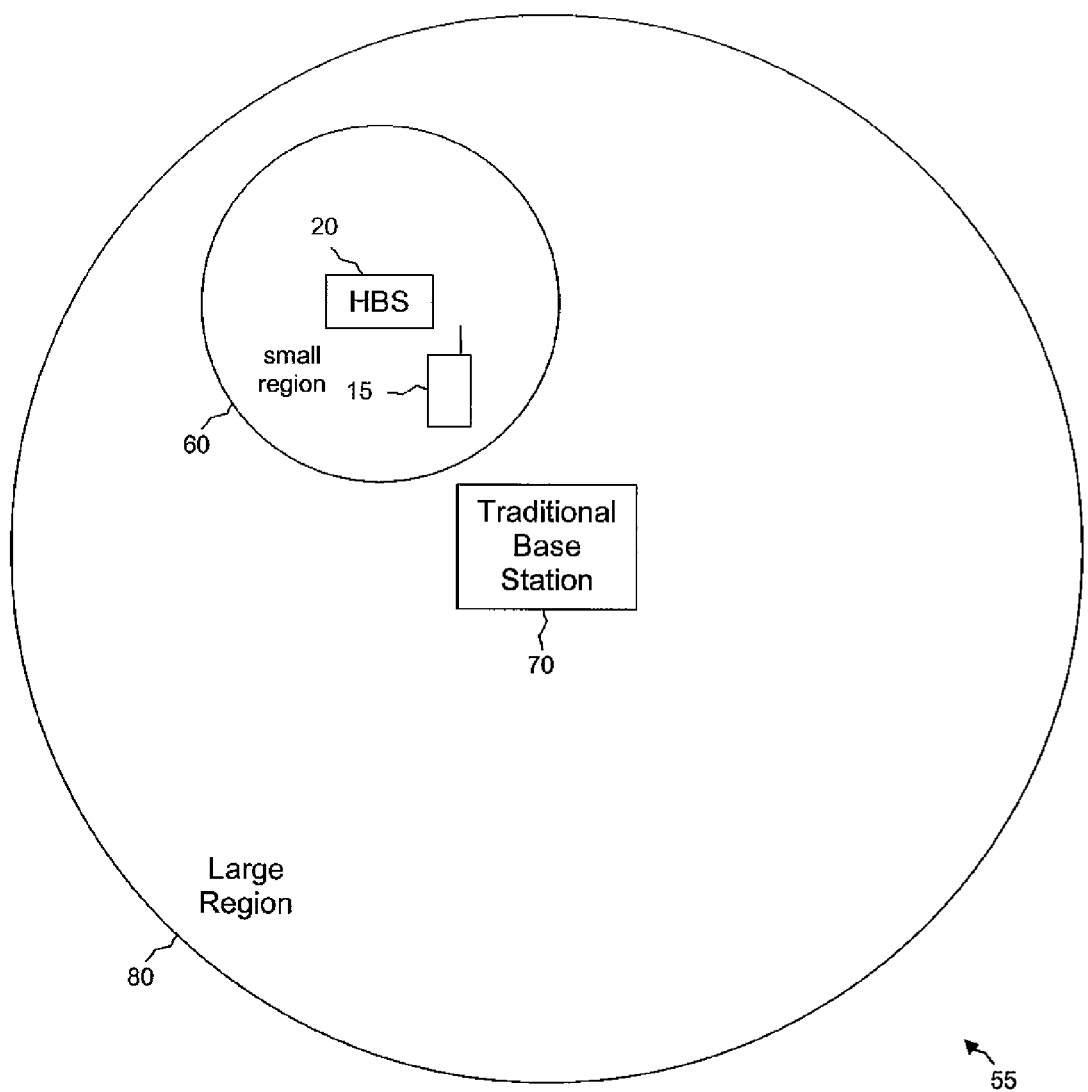
FIG. 2 is a diagram of another telecommunications system according to an embodiment of the disclosure.

FIG. 2 illustrates an embodiment of a telecommunications system 55 in which a device that is not registered with the HBS 20 might pick up a beacon signal from the HBS 20. The HBS 20 broadcasts a relatively weak signal in a relatively small region 60, which might represent the immediate vicinity of a home or business. The HBS 20 might connect to the telecommunications network 40 via the network 30, such as the Internet, as shown in FIG. 1. A traditional base station 70 broadcasts a relatively strong signal in a relatively large region 80 in which the HBS 20 might be located. A foreign device 15 may be within region 80 and may also be within region 60. For example, the foreign device 15 might be a device in a home near the home where the HBS 20 is located or might be a device in an automobile that is passing by the home where the HBS 20 is located.

When a device, such as the user device 10 or the foreign device 15, initiates a call, the device automatically locks on to the base station with the strongest signal. In some cases this might be the HBS 20 and in some cases this might be the traditional base station 70. A device user is typically unaware of and has no control over which base station the device locks on to. That is, a user of the user device 10 might simply place a call without any concern for which base station the call passes through. In some cases, however, the user of the user device 10 might attempt to gain better call quality by deliberately moving closer to the HBS 20 in order to place a call through the HBS 20.

Similarly, a foreign user might unintentionally or deliberately attempt to place a call through the HBS 20. In some cases, the foreign user might be unaware of the presence of the HBS 20 and the foreign device 15 might automatically lock on to the HBS 20 without the foreign users knowledge. However, in other cases, the foreign user might be aware of the presence of the HBS 20 and might deliberately attempt to gain unauthorized access to the HBS 20. For example, the foreign user might learn that, in one portion of the foreign user's home, which might be adjacent to the home in which the HBS 20 is located, the foreign device 15 picks up the beacon signal from the traditional base station 70 and, in another portion of the foreign users home, the foreign device 15 picks up the beacon signal from the HBS 20. The foreign user might deliberately move to a room where the beacon signal from the HBS 20 is picked up in an attempt to obtain free use of the HBS 20. In another example, the traditional base station 70 might not be present and the foreign user might be unable to make wireless calls in region 80. However, the foreign user may be aware that a neighbor has purchased the HBS 20 and that it may be possible to pick up the beacon signal from the HBS 20. The foreign user may deliberately attempt to gain access to the HBS 20 in an attempt to make calls that could not be made otherwise.

In such situations, the foreign device 15 might lock on to the HBS 20 and attempt to initiate a call via the HBS 20. If such a call were connected, the call might consume the resources of the HBS 20, such as bandwidth and electrical power, and might allow the foreign user to have free use of the HBS 20 at the expense of the owner of the HBS 20. Therefore, it may be undesirable to allow the call to pass through the HBS 20.

However, if the HBS 20 does not accept the call or does not hand the call off to the traditional base station 70, the foreign device 15 might not be able to complete the call because it will see the HBS 20 as the strongest base station and will continue to try to connect through the HBS 20. In the case of a deliberate attempt by the foreign user to gain unauthorized access to the HBS 20, it may be acceptable that the call is not connected. The HBS 20 might determine that the identifier of the foreign device 15 is not an identifier of an authorized device and might deny the foreign device 15 access to the HBS 20. In the case of an unintentional attempt by the foreign device 15 to gain access to the HBS 20, however, there may be circumstances in which it is acceptable to allow access to the HBS 20. For example, if the owner of the HBS 20 and the foreign user are customers of the same telecommunications company, the company may wish to allow the foreign user access to the HBS 20 to improve customer service and satisfaction.

In an embodiment, a set of policies might be implemented to deal with these and other cases where a connection is attempted between the foreign device 15 and the HBS 20. The connection might be an outgoing call intended to pass from the foreign device 15 to the HBS 20 or an incoming call intended to pass to the foreign device 15 from the HBS 20. As used herein, the term "call" can refer to a voice call or a data call.

One policy might be referred to as active service redirection and might specify that the HBS 20 should attempt to hand off to a traditional base station non-emergency calls placed by foreign devices 15. Under this policy, the HBS 20 might automatically determine the signal strengths of nearby traditional base stations and if a traditional base station with a sufficiently strong signal is found, the HBS 20 might hand the call off to that base station. Active service redirection might also be implemented for the foreign device 15 or a home device when all resources on the HBS 20 are occupied. This can reduce the probability of blocked calls. For non-emergency calls made to foreign devices 15, idle service redirection might be implemented. In idle service redirection, an attempt might be made to hand off to a traditional base station a call placed to the foreign device 15 even though the foreign device 15 is not active at the time the call is placed.

Another policy might be referred to as low priority access and might be implemented when active service redirection cannot be implemented. For example, if a traditional base station with a sufficiently strong signal cannot be found or if active service redirection has been disabled, low priority access might be implemented. In low priority access, a connection between the foreign device 15 and the HBS 20 might be allowed when sufficient resources are available on the HBS 20. In an embodiment, only limited resources of the HBS 20 are made available to the foreign device 15 so that authorized users of the HBS 20 will still have access to the HBS 20 without undue disruption of service.

Another policy might be referred to as restriction treatment and might be implemented when active service redirection and low priority access cannot be implemented. For example, if a call cannot be handed off to a traditional base station and if sufficient resources to handle the call are not available on the HBS 20, restriction treatment might be implemented. In restriction treatment, the call is not allowed. That is, the call is not handed off to a traditional base station and is not passed through the HBS 20. In the case of a call initiated by the foreign device 15, an automated voice announcement might be sent to the foreign device 15 indicating that access to the HBS 20 is restricted and that the call initiation has been denied. In the case of an incoming call to the foreign device 15, the call might be redirected to the foreign user's voice mail system. In an alternative embodiment, the restriction treatment policy is not applied to incoming calls and all incoming calls to the foreign device 15 are allowed when possible.

Another policy might be referred to as E911 access and applies to calls placed by the foreign device 15 to a public emergency response system, such as the 911 system. Under E911 access, the above policies do not apply and public emergency calls from the foreign device 15 are always allowed. In some cases, an emergency call might be handed off to a traditional base station and in other cases an emergency call might be passed through the HBS 20. If sufficient resources are not available on the HBS 20, an existing call on the HBS 20 might be automatically terminated in order to free resources for the emergency call.

Figure 3:
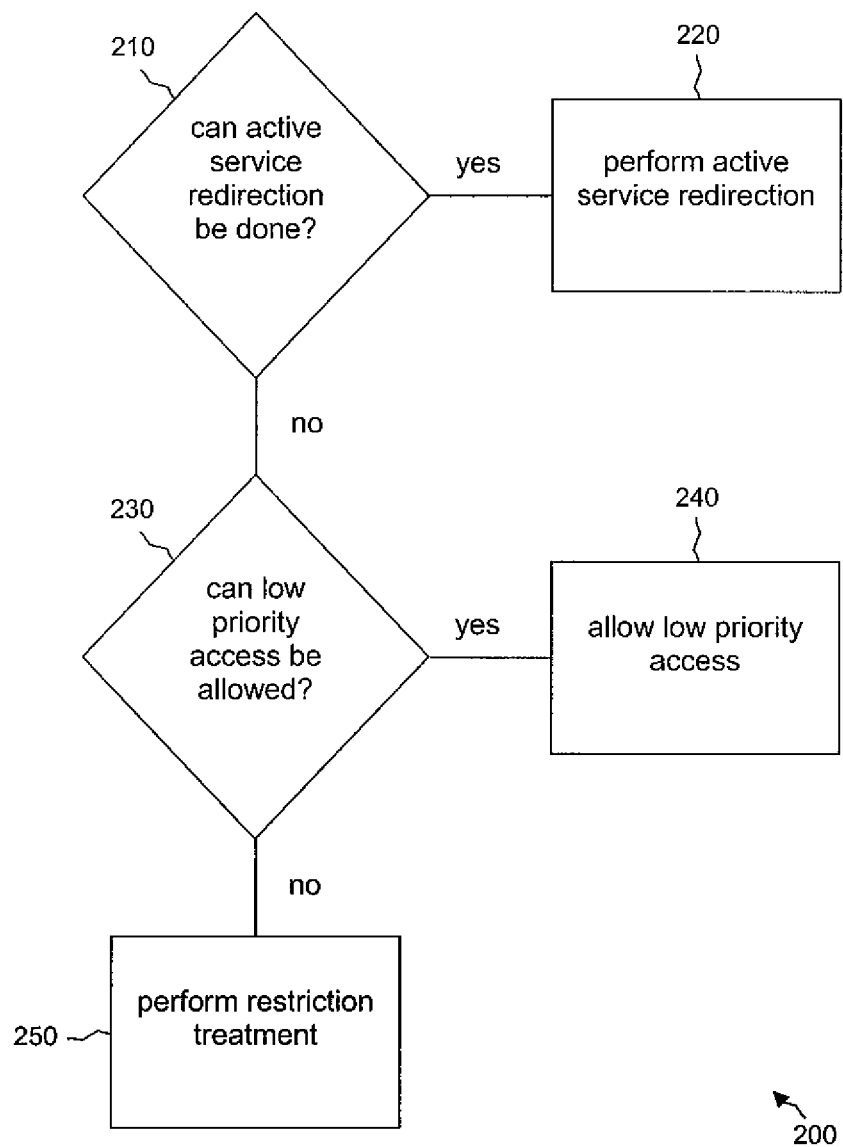
FIG. 3 is a diagram of a method for filtering unauthorized mobile devices according to an embodiment of the disclosure.

FIG. 3 illustrates an embodiment of a method 200 for managing an attempted connection between a foreign device and an HBS. In block 210, it is determined whether the active service redirection policy can be implemented. For example, the HBS might determine the signal strengths from nearby traditional base stations. If a strong enough signal is found, active service redirection might be performed in block 220.

If the active service redirection policy cannot be implemented, for example if active service redirection is disabled or if a strong enough signal from a traditional base station cannot be found, then it is determined, in block 230, whether the low priority access policy can be implemented. For example, it might be determined whether sufficient resources are available on the HBS for the HBS to handle the connection. If sufficient resources are available, low priority access might be allowed in block 240.

If the low priority access policy cannot be implemented, for example if sufficient resources are not available on the HBS, the restriction treatment policy might be enforced at block 250. For example, an outgoing call from a foreign device might be blocked and a message might be sent to the foreign device stating that service is restricted or otherwise informing the foreign user that the call cannot be completed. An incoming call to a foreign device might be blocked and the call might be redirected to the foreign user's voice mail system.

In the case of a call from the foreign device to a public emergency system, the above three policies might not be enforced and the public emergency call might be allowed under all circumstances. In some cases, it may first be determined whether a call is an emergency call and, if so, the call is passed through the HBS regardless of the resources currently in use on the HBS. In other cases, it may first be determined whether a traditional base station is available to which a call can be handed off. If a traditional base station is available, the call is handed off to the traditional base station regardless of whether the call is an emergency call or a non-emergency call. These two alternatives are illustrated in FIGS. 4 and 5, respectively.

Figure 4:
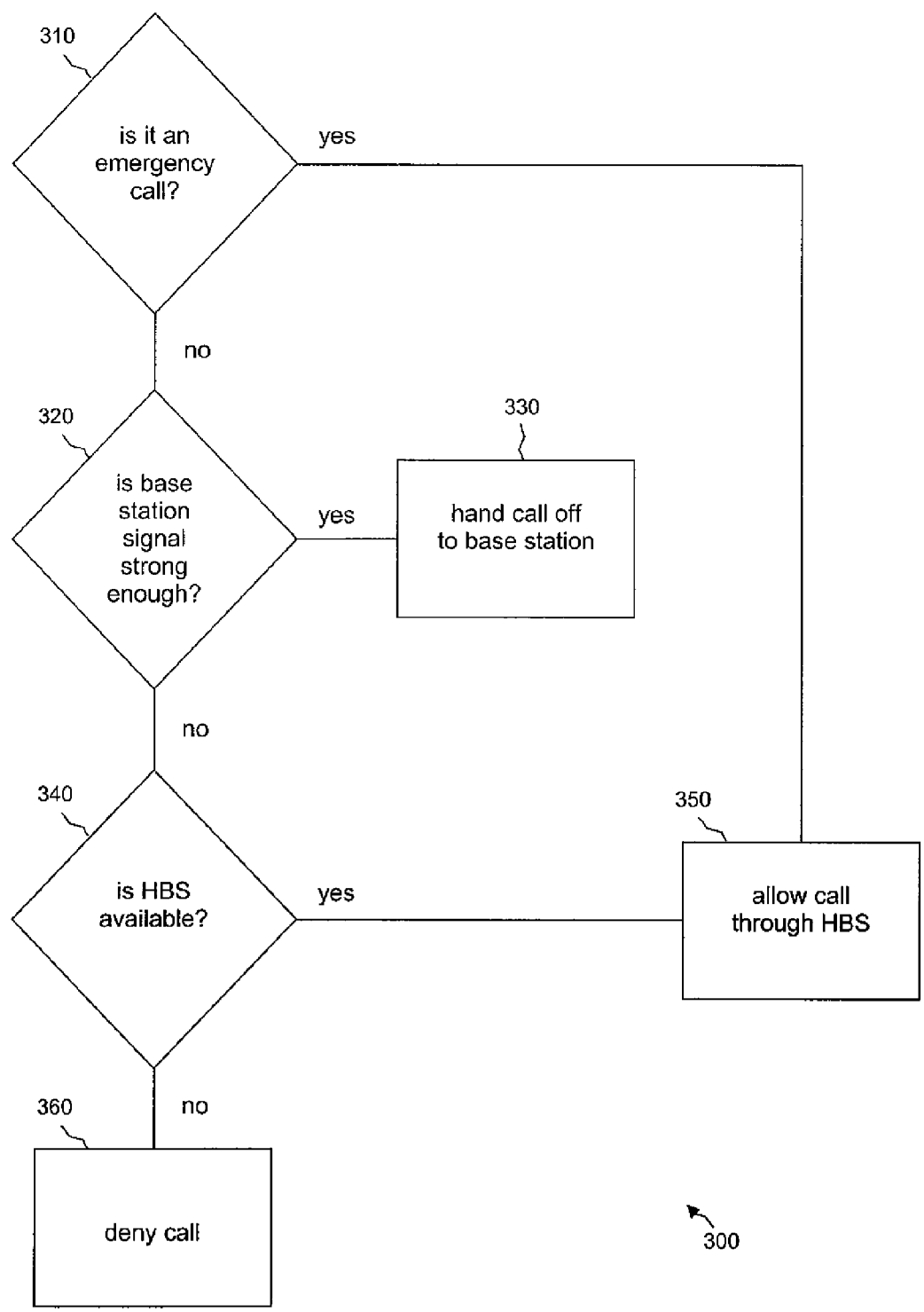
FIG. 4 is a diagram of a method for filtering unauthorized mobile devices according to an alternative embodiment of the disclosure.

FIG. 4 illustrates a method 300 for filtering calls from a foreign device to an HBS. In block 310, it is determined whether the call is a public emergency call. If the call is an emergency call, the call is allowed to pass through the HBS, as shown in block 350. If the call is not an emergency call, it is determined, in block 320, whether there is a signal from a traditional base station that is strong enough to handle the call. If a strong enough signal is found, the call is handed off to the traditional base station in block 330. If a strong enough signal is not found, it is determined, in block 340, whether sufficient resources are available on the HBS to handle the call without undue disruption of service to the owner of the HBS. If sufficient resources are available on the HBS, the call is allowed to pass through the HBS, as shown in block 350. If sufficient resources are not available on the HBS, the call is denied, as shown in block 360.

Figure 5:
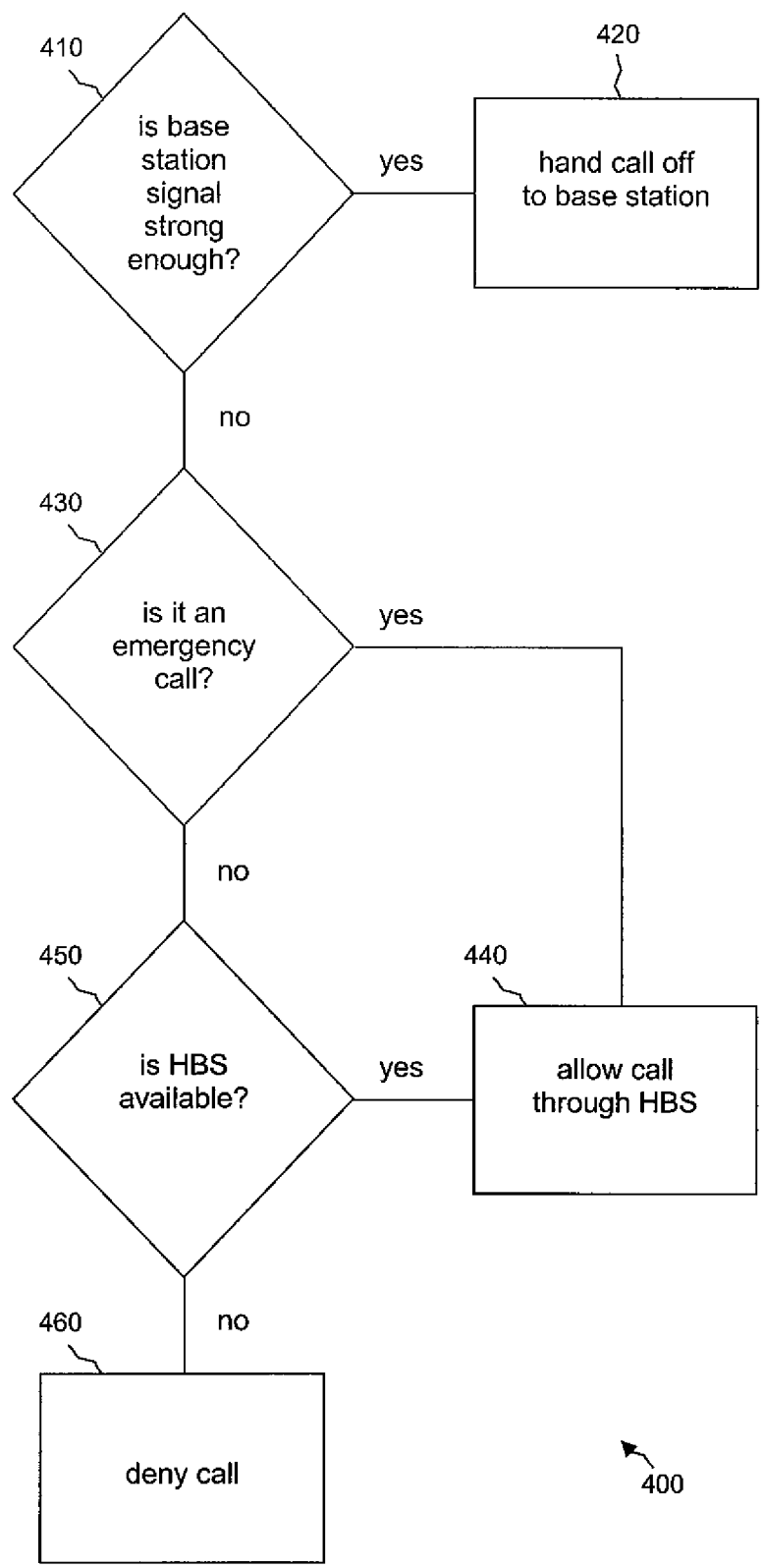
FIG. 5 is a diagram of a method for filtering unauthorized mobile devices according to an alternative embodiment of the disclosure.

FIG. 5 illustrates an alternative method 400 for filtering calls from a foreign device to an HBS. In block 410, it is determined whether there is a signal from a traditional base station that is strong enough to handle the call. If a strong enough signal is found, the call is handed off to the traditional base station in block 420. That is, a handoff is performed whenever possible for both emergency and non-emergency calls. If a strong enough signal is not found, it is determined, in block 430, whether the call is a public emergency call. If the call is an emergency call, the call is allowed to pass through the HBS, as shown in block 440. If the call is not an emergency call, it is determined, in block 450, whether sufficient resources are available on the HBS to handle the call. If sufficient resources are available on the HBS, the call is allowed to pass through the HBS, as shown in block 440. If sufficient resources are not available on the HBS, the call is denied, as shown in block 460.

In various embodiments, the component or components, such as hardware and/or software, that specify and enforce these policies can reside in various places. For example, policy-related functionality might reside entirely on the HBS 20, entirely on the network 40 or the network component 50, or partially on the HBS 20 and partially on the network 40 or the network component 50.

Figure 6:
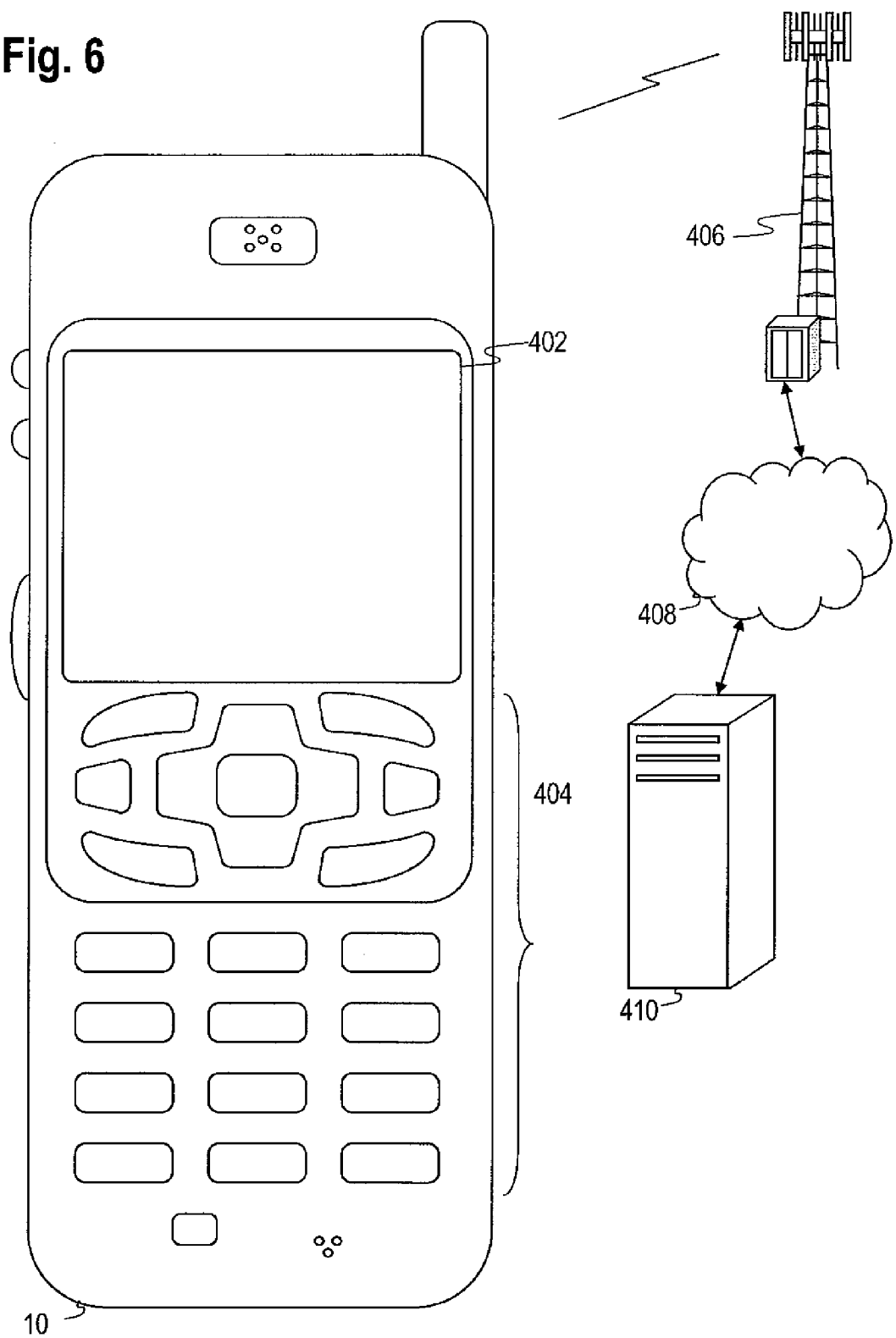
FIG. 6 is a diagram of a wireless communications system including a user device operable for some of the various embodiments of the disclosure.

FIG. 6 shows a wireless communications system including an embodiment of the user device 10. The user device 10 may be operable for implementing aspects of the present disclosure, but the present disclosure should not be limited to these implementations. Though illustrated as a mobile phone, the user device 10 may take various forms including a wireless handset, a pager, a personal digital assistant (PDA), a portable computer, a tablet computer, or a laptop computer. Many suitable handsets combine some or all of these functions. In some embodiments of the present disclosure, the user device 10 is not a general purpose computing device like a portable, laptop or tablet computer, but rather is a special-purpose communications device such as a mobile phone, wireless handset, pager, or PDA. The user device 10 may support specialized activities such as gaming, inventory control, job control, and/or task management functions, and so on.

The user device 10 includes a display 402 and a touch-sensitive surface or keys 404 for input by a user. The user device 10 may present options for the user to select, controls for the user to actuate, and/or cursors or other indicators for the user to direct. The user device 10 may further accept data entry from the user, including numbers to dial or various parameter values for configuring the operation of the handset. The user device 10 may further execute one or more software or firmware applications in response to user commands. These applications may configure the user device 10 to perform various customized functions in response to user interaction. Additionally, the user device 10 may be programmed and/or configured over-the-air, for example from a wireless base station, a wireless access point, or a peer user device 10.

The user device 10 may execute a web browser application which enables the display 402 to show a web page. The web page may be obtained via wireless communications with a cell tower 406, a wireless network access node, a peer user device 10 or any other wireless communication network or system, such as the telecommunications network 40 of FIG. 1. The cell tower 406 (or wireless network access node) is coupled to a wired network 408, such as the Internet. Via the wireless link and the wired network, the user device 10 has access to information on various servers, such as a server 410. The server 410 may provide content that may be shown on the display 402. Alternately, the user device 10 may access the cell tower 406 through a peer user device 10 acting as an intermediary, in a relay type or hop type of connection.

Figure 7:
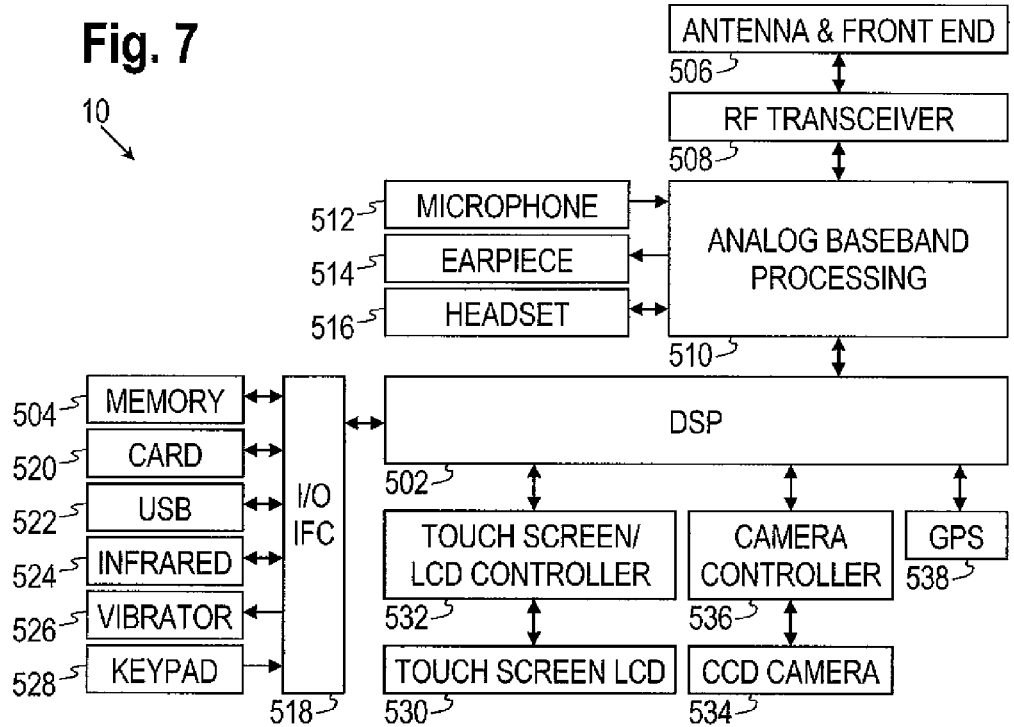
FIG. 7 is a block diagram of a user device operable for some of the various embodiments of the disclosure.

FIG. 7 shows a block diagram of the user device 10. While a variety of known components of user devices 10 are depicted, in an embodiment a subset of the listed components and/or additional components not listed may be included in the user device 10. The user device 10 includes a digital signal processor (DSP) 502 and a memory 504. As shown, the user device 10 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the user device 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the user device 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the user device 10 to send and receive information from a cellular network or some other available wireless communications network or from a peer user device 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the user device 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the user device 10 to function as a peripheral device to exchange information with a personal computer or other computer system. The infrared port 524 and other optional ports such as a Bluetooth interface or an IEEE 802.11 compliant wireless interface may enable the user device 10 to communicate wirelessly with other nearby handsets and/or wireless base stations.

The input/output interface 518 may further connect the DSP 502 to the vibrator 526 that, when triggered, causes the user device 10 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the user device 10. Another input mechanism may be the touch screen LCD 530, which may also display text and/or graphics to the user. The touch screen LCD controller 532 couples the DSP 502 to the touch screen LCD 530.

The CCD camera 534 enables the user device 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the user device 10 to determine its position. Various other peripherals may also be included to provide additional functions, e.g., radio and television reception.

Figure 8:
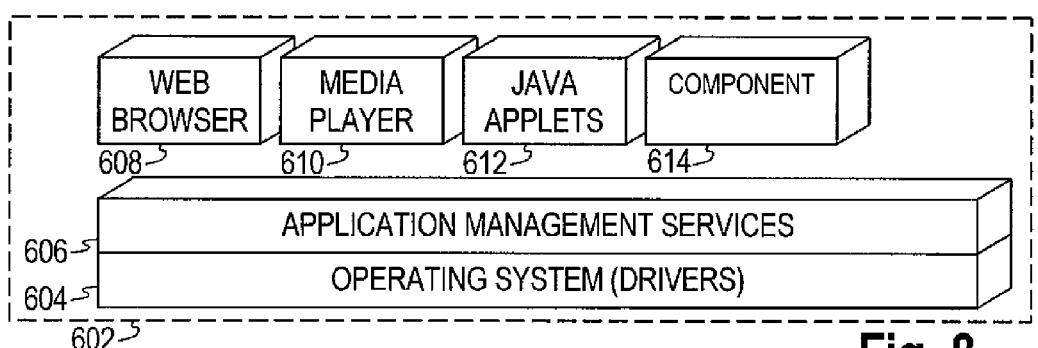
FIG. 8 is a diagram of a software environment that may be implemented on a user device operable for some of the various embodiments of the disclosure.

FIG. 8 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the user device 10. Also shown in FIG. 8 are a web browser application 608, a media player application 610, and Java applets 612. The web browser application 608 configures the user device 10 to operate as a web browser, allowing a user to enter information into forms and select links to retrieve and view web pages. The media player application 610 configures the user device 10 to retrieve and play audio or audiovisual media. The Java applets 612 configure the user device 10 to provide games, utilities, and other functionality. A component 614 might provide functionality related to the HBS 20.

Figure 9:
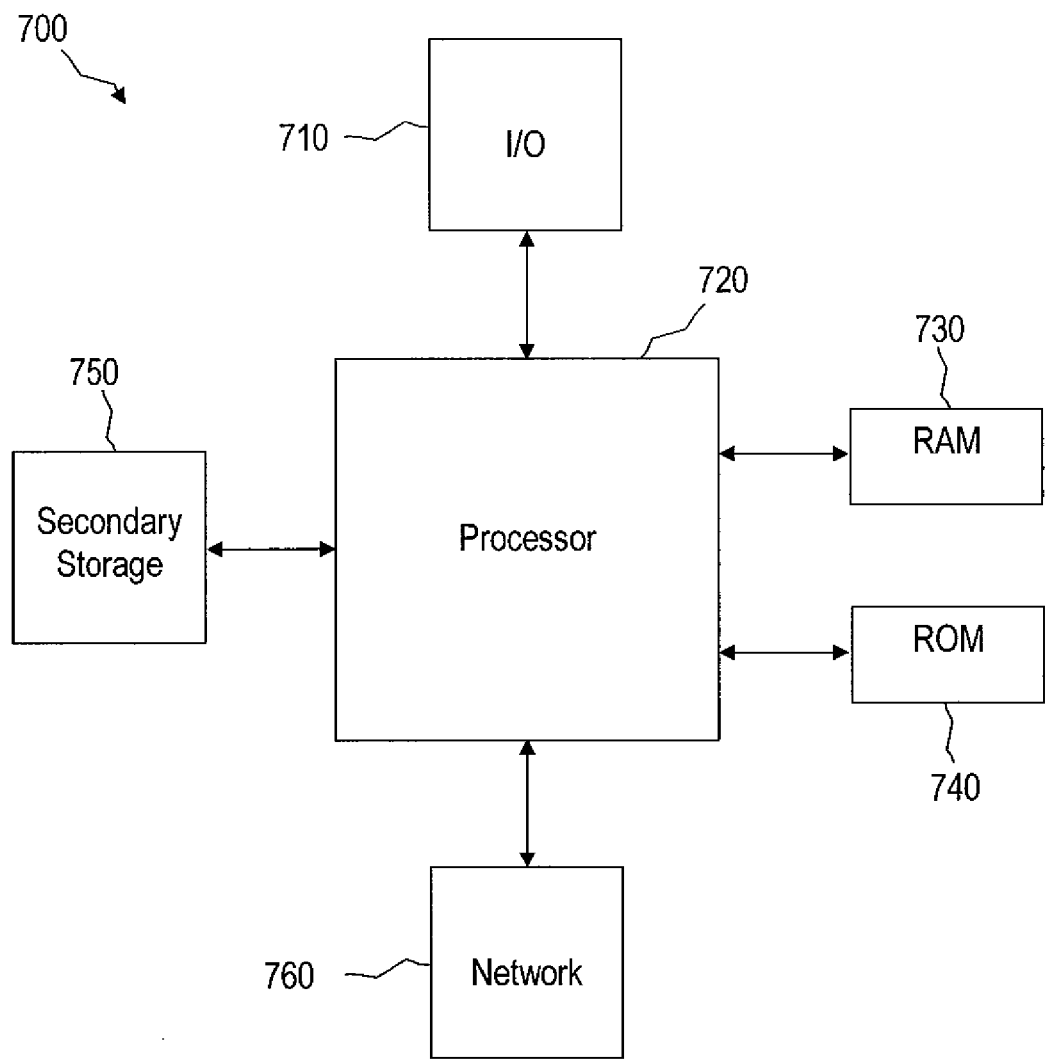
FIG. 9 is an illustrative general purpose computer system suitable for some of the various embodiments of the disclosure.

The HBS 20 may include any general-purpose or special-purpose computer with sufficient processing power, memory resources, and network throughput capability to handle the necessary workload placed upon it. FIG. 9 illustrates a typical, general-purpose computer system 700 that may be suitable for implementing one or more embodiments disclosed herein. Similar components and functions might also be applicable to a suitable special-purpose computer. The computer system 700 includes a processor 720 (which may be referred to as a central processor unit or CPU) that is in communication with memory devices including secondary storage 750, read only memory (ROM) 740, random access memory (RAM) 730, input/output (I/O) devices 710, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk based systems may all be considered secondary storage 750), ROM 740, RAM 730, or the network connectivity devices 760.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for managing an attempted connection between a home base station (HBS) and a device not registered with the HBS, comprising:
   determining, at the HBS, whether the attempted connection can be transferred to a traditional base station by determining a signal strength of at least one traditional base station;
   upon a determination that the attempted connection can be transferred to a traditional base station, transferring the connection regardless of whether or not the connection is a call to a public emergency response system;
   upon a determination that the attempted connection cannot be transferred to a traditional base station, determining whether the attempted connection is a call to a public emergency response system and, if so, connecting the call to the public emergency response system through the HBS;
   upon a determination that the attempted connection is not a call to a public emergency response system, determining whether a portion of the resources of the HBS can be used by the device not registered with the HBS and, when the portion of the resources can be used, using the portion of the resources; and
   when the portion of the resources cannot be used, not completing the attempted connection.

2. The method of claim 1, wherein the attempted connection is transferred to the traditional base station when the traditional base station has a sufficient signal strength to reliably communicate with the device not registered with the HBS.

3. The method of claim 1, wherein the portion of the resources of the HBS is used by the device not registered with the HBS when the portion of the resources can be used without disruption of existing communications on the HBS.

4. The method of claim 1, wherein the attempted connection is one of an outgoing call attempt placed by the device not registered with the HBS and an incoming call attempt placed to the device not registered with the HBS.

5. The method of claim 4, wherein, when the attempted connection is the outgoing call attempt and when the attempted connection fails to complete, sending a message to the device not registered with the HBS stating that the attempted connection was not completed.

6. The method of claim 4, wherein, when the attempted connection is the incoming call attempt and when the attempted connection fails to complete, transferring the incoming call attempt to a voice mail system associated with the device not registered with the HBS.

7. The method of claim 4, wherein, when the attempted connection is the outgoing call attempt and when the outgoing call attempt is a call to a public emergency response system, connecting the outgoing call to the public emergency response system.

8. The method of claim 1, wherein the attempted connection is made in a code division multiple access telecommunications system.

9. The method of claim 1, wherein the HBS is connected to the traditional base station through a wired network.

10. The method of claim 1, wherein the HBS is connected to the traditional base station through a wireless network.

11. A system for managing communications between a home base station (HBS) and a device not registered with the HBS, comprising:
the HBS configured to determine whether a call can be transferred to a traditional base station by determining a signal strength of the traditional base station, the HBS having a processor configured to execute a plurality of policies including:
an active service redirection policy, wherein the call is handed off to the traditional base station when the traditional base station has a sufficient signal strength to reliably communicate with the device not registered with the HBS, regardless of whether or not the call is a call to a public emergency response system;
a low priority access policy, wherein, when the active service reduction policy is inapplicable, and when a portion of resources of the HBS is available to the device not registered with the HBS without disruption of existing communications on the HBS, the HBS is used for the call;
a restriction treatment policy, wherein, when the active service reduction policy and the low priority access policy are inapplicable, the call is not connected by the HBS; and
an E911 access policy, wherein, when the call is a call to a public emergency response system, the call is connected to the public emergency response system, wherein the processor is configured to process the call according to the active service redirection policy before processing the call according to the E911 access policy.

12. The system of claim 11, wherein the call is attempted in a code division multiple access telecommunications system.

13. The system of claim 12, wherein at least a portion of a component operable to enforce the active service redirection policy, the low priority access policy, the restriction treatment policy, and the E911 access policy resides on the HBS.

14. The system of claim 13, wherein at least a second portion of the component operable to enforce the active service redirection policy, the low priority access policy, the restriction treatment policy, and the E911 access policy resides on the code division multiple access telecommunications system.

15. The system of claim 11, wherein the HBS is connected to the traditional base station through a wired network.

16. The system of claim 11, wherein the HBS is connected to the traditional base station through a wireless network.

17. A home base station (HBS), comprising:
a processor configured to determine whether a call to the HBS from a device not registered with the HBS can be transferred to a traditional base station by determining a signal strength of the traditional base station; and
a component configured to filter the call by enforcing a plurality of policies, the policies specifying that:
when the traditional base station has a sufficient signal strength to reliably communicate with the device not registered with the HBS, the call is handed off to the traditional base station regardless of whether or not the call is a call to a public emergency response system, and
when the traditional base station does not have the sufficient signal strength to reliably communicate with the device not registered with the HBS, it is determined whether the call is a call to a public emergency response system, and
when the call is a call to the public emergency response system, the call is allowed to pass through the HBS, and
when the call is not a call to the public emergency response system, it is determined whether a portion of resources of the HBS is available to the device not registered with the HBS without disruption of existing communications on the HBS, and
when the portion of resources of the HBS is available to the device not registered with the HBS without disruption of existing communications on the HBS, the HBS is used for the call, and
when the portion of the resources of the HBS are not available to the device not registered with the HBS without disruption of existing communications on the HBS, the call is not completed.

18. The HBS of claim 17, wherein the call is made in a code division multiple access telecommunications system.

19. The HBS of claim 17, wherein the HBS is connected to the traditional base station through a wired network.

20. The HBS of claim 17, wherein the HBS is connected to the traditional base station through a wireless network.

* * * * *